3,825,570
PROCESS FOR THE PREPARATION OF
ε-CAPROLACTONE
Yutaka Fujita, Tatsuyuki Naruchi, Yuitsu Honda, Kenji Ishimaru, and Eishin Yoshisato, Iwakuni, Japan, assignors to Teijin Limited, Osaka, Japan
No Drawing. Filed Nov. 2, 1971, Ser. No. 195,032
Int. Cl. C07d 9/00
U.S. Cl. 260—343                15 Claims

ABSTRACT OF THE DISCLOSURE

A process for the preparation of ε-caprolactone which comprises heating at least one amide selected from the group consisting of ε-hydroxycaproamide and amides of low polymerization products of ε-hydroxycaproic acid, in the presence of an alcoholic compound containing at least one free alcoholic hydroxyl group in its molecule, in an amount such that, when one ε-hydroxycaproic acid unit of the formula $\{O-(CH_2)_5CO\}$ contained in the amide is calculated as one molecule of ε-hydroxycaproic acid, the total number of free alcoholic hydroxyl groups present in the reaction system exceeds the total number of carboxyl groups present in the reaction system, under such temperature and pressure conditions to allow distillation of ε-caprolactone.

---

This invention relates to a process for making ε-caprolactone from ε-hydroxycaproamide, or an amide of a low polymer of ε-hydroxycaproic acid or a mixture of the foregoing.

ε-Hydroxycaproamide and amides of low polymerization products of ε-hydroxycaproic acid can be generally expressed by the formula below:

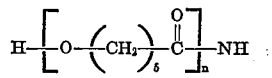

in which $n$ is a positive integer indicating the average degree of polymerization of ε-hydroxycaproic acid. If $n$ equals 1 in the formula above, it expresses ε-hydroxycaproamide, and when, $n$ is 2 or more, the formula expresses an amide of a low polymer of ε-hydroxycaproic acid. The subject invention relates to a process for making ε-caprolactone from ε-hydroxycaproamide, or an amide of a low polymer of ε-hydroxycaproic acid, wherein $n$ ranges from 1 to 20, preferably 1 to 10, or mixture of such amides. The present process is also applicable to amides of polymers of ε-hydroxycaproic acid with $n$ exceeding 20. However, from an industrial standpoint, preparation of ε-caprolactone from amides of polymers of such high degrees of polymerization of ε-hydroxycaproic acid shows no particular advantage.

ε-Caprolactone is a very useful starting material for ε-caprolactam, because it can provide ε-caprolactam at high yield when reacted with ammonia, without side-producing ammonium sulfate.

Known means for producing ε-caprolactam from ε-caprolactone include, for example, (a) Method of heating ε-caprolactone in aqueous ammonia, at temperatures ranging from Tc to Tc+100° C. under the autogeneous pressure. (Tc is the critical temperature of water.) (U.S. Pat. No. 3,000,880), (b) Performance of above method in the presence of hydrogenation catalyst, preferably in a hydrogen atmosphere (U.S. Pat. Nos. 3,317,516 and 3,317,517), and (c) Method of reacting ε-caprolactone with ammonia in the vapor phase, in the presence of hydrogen and copper chromite catalyst, at temperatures ranging from 170–300° C. (British Pat. No. 1,109,540).

Furthermore, (d) a method of making ε-caprolactam at high yield, by contacting ε-caprolactone or a lower alkyl ester of ε-hydroxycaproic acid, ammonia, and hydrogen, in the vapor phase, within the temperature range of 200–300° C., with a solid catalyst composed of (a) at least one oxide selected from the group consisting of titanium dioxide, alumina, alumina-silica and silica, and (b) metal copper, has been developed by our colleagues who are also among the inventors of this invention. The last-mentioned process is the subject of our co-pending application Ser. No. 121,550, now abandoned.

Compared with the liquid phase reactions of methods (a) and (b) which must be performed at high temperature and pressure conditions, the vapor phase reactions of methods (c) and (d) can be practiced at normal or nearly normal pressure, and furthermore can produce ε-caprolactam at a favorably high yield. Therefore the latter methods are particularly advantageous.

ε-Hydroxycaproamide or amides of low polymers of ε-hydroxycaproic acid, which are used as the starting material in the subject process, can be directly converted to ε-caprolactam, by heating them in aqueous ammonia to high temperatures under high pressures. However, such means again require high temperature and pressure, and the resulting ε-caprolactam yield is not necessarily satisfactory (U.S. Pat. No. 3,000,879).

Accordingly, the main object of this invention is to provide a process for making ε-caprolactone from ε-hydroxycaproamide or an amide of a low polymer of ε-hydroxycaproic acid, or mixtures of the foregoing, through an easy operation and at high yield.

Another object of the invention is to provide a process for making ε-caprolactone with ease and at high yield, from the reaction residue containing ε-hydroxycaproamide, or an amide of a low polymer of ε-hydroxycaproic acid, or a mixture of the foregoing, such reaction residue being that which remains after recovering ε-caprolactone from the reaction mixture resulting from the reaction of ε-caprolactone or lower alkyl ester of ε-hydroxycaproic acid with ammonia in the liquid or vapor phase, particularly vapor phase, for making ε-caprolactam.

Still other objects and advantages of the invention will become apparent from the following more detailed description.

It has now been discovered that ε-caprolactone can be produced through a very simple operation and at high yield, by heating at least one amide selected from the group consisting of ε-hydroxycaproamide and amides of low polymers of ε-hydroxycaproic acid, in the presence of an alcoholic compound containing at least one free alcoholic hydroxyl group in its molecule, in an amount that, when one ε-hydroxycaproic acid unit of the formula,

contained in the amide is calculated as one molecule of ε-hydroxycaproic acid, the total number of free alcoholic hydroxyl groups present in the reaction system should exceed the total number of carboxyl groups, under such temperature and pressure conditions to allow distillation of ε-caprolactone.

Previously, it was discovered that ε-caprolactone can be produced at high yield, by heating ε-hydroxycaproic acid, low polymers thereof, or esters thereof in the presence of excessive alcoholic hydroxyl groups in a similar manner similarly to the above, under conditions to allow distillation of ε-caprolactone, such process being described in co-pending U.S. patent application Ser. No. 20,017 now U.S. Pat. 3,624,258.

In the cause of further studies on the above process, it has now been found that, upon application of the above process to ε-hydroxycaproamide or amides of low polymers of ε-hydroxycaproic acid under identical or nearly identical conditions, those amides can be very smoothly and furthermore, directly, converted to ε-caprolactone.

It is entirely beyond expectation that such amides as ε-hydroxycaproamide can be converted to ε-caprolactone at high reaction rate and at high yield in the presence of even extremely minor amounts of alcohol, under the reaction conditions specified in this invention.

The reaction conditions to be employed in this invention will be hereinafter explained in further detail.

As already mentioned, according to the invention, when one ε-hydroxycaproic acid unit of the formula,

contained is the ε-hydroxycaproamide, an amide of a low polymer of ε-hydroxycaproic acid, or a mixture thereof, which is fed into the reaction system of the invention as the starting material, is calculated as one molecule of ε-hydroxycaproic acid, the total number of carboxyl groups present in the reaction system should be less than the total number of alcoholic hydroxyl groups also present in the reaction system.

If the starting material fed into the reaction system consists solely of ε-hydroxycaproamide, or an amide of a low polymer of ε-hydroxycaproic acid, or a mixture of the foregoing, the total number of carboxyl groups present in the reaction system equals that of the alcoholic hydroxyl groups, when each ε-hydroxycaproic acid unit as above, which is contained in such starting material, is calculated as one molecule of ε-hydroxycaproic acid. Therefore, to make the total number of the alcoholic hydroxyl groups in excess of the carboxyl group, it is sufficient to add a very minor amount of alcoholic hydroxyl group-containing compound to the reaction system.

However, if the starting material contains compounds other than the above-specified amides, as impurities or side-products, e.g., other carboxylic acids such as cyclopentanecarboxylic acid, 5-hexenoic acid, adipic acid, etc., other alcohols such as cyclopentanol, 1,6-hexanediol, etc., esters of the foregoing; esters of those acids and/or alcohols with ε-hydroxycaproic acid or aforesaid amides; and amides of aforesaid side-produced carboxylic acids; all the ester linkages and acid amide linkages in all the compounds present in the reaction system of the invention, inclusive of not only the specified amides but also all of such impurities and side-products, should be assumed to be hydrolyzed, and the total number of alcoholic hydroxyl groups should be made in excess of the total number of carboxyl groups present in the reaction system.

According to the present invention, the starting material composed of at least one amide of the formula,

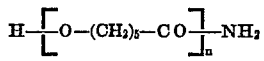

in which $n$ is a positive integer of 1–20, and when $n$ is 2–20, it indicates the average degree of polymerization, or such amide with the aforesaid impurities and side-products, is fed into the reaction system and heated under such temperature and pressure conditions to allow distillation of ε-caprolactone, in the presence of an alcoholic compound, which contains in its molecule at least one free alcoholic hydroxyl group, in an amount satisfying the formula, $$X \geqq 1.01Y \quad (1)$$

in which, assuming that every ester linkage and/or acid amide linkage in all the compounds present in the reaction system is hydrolyzed, X is the total number of alcoholic hydroxyl groups present in the reaction system, and Y is the total number of carboxyl groups present in the reaction system, or more preferably, satisfying the formula, $$X \geqq 1.05Y \quad (2)$$

inter alia, $$X \geqq 1.1Y \quad (3)$$

in the above formulae (2) and (3), the definitions of X and Y are the same as those of formula (1). Through the above specified procedure, ε-caprolactone can be produced at high yield.

Therefore, according to the invention, if the starting material already contains an alcoholic compound or compounds in a quantity sufficient to satisfy the above formula (1), preferably formula (2), inter alia, formula (3), as the impurities or side-products, it is unnecessary to add more alcoholic compound to the reaction system at the initiation of subject reaction. Again, when the alcoholic compound existing in the reaction system (reaction mixture) in advance is distilled off from the system together with the ε-caprolactone formed, or a part of the alcoholic compound is decomposed during the progress of the subject reaction, the alcoholic compound must be added to the reaction system, at such a rate as will always maintain the reaction mixture under conditions to satisfy the foregoing formula (1), preferably formula (2), inter alia, formula (3).

In short, it is critical for the invention to heat the reaction mixture under the temperature and pressure conditions to allow distillation of ε-caprolactone, while maintaining the quantitative ratio of X to Y in the reaction system satisfying the formula (1), preferably formula (2), particularly, formula (3).

As the temperature and pressure conditions for heating the starting material while allowing the distillation of ε-caprolactone, a temperature range of 180–340° C. at the pressure of 0.1–300 mm. Hg, particularly the range of 200–300° C. at the pressure ranging from 0.5–200 mm. Hg, are well suited. When the heating under such conditions is practiced in the manner to allow distillation of ε-caprolactone, the ammonia side-produced by decomposition of the starting amide or amides is distilled off from the system together with the ε-caprolactone formed. Thus it is possible to recover ammonia simultaneously with ε-caprolactone formation.

If heating temperatures much higher than the above-specified range are employed, ε-caprolactone tends to decompose. Also under excessively low temperatures the formation rate of ε-caprolactone in the reaction system is reduced. Again, at higher pressures than the above-specified range, distillation of the formed ε-caprolactone from the reaction system becomes difficult. Lower pressures than the specified range on the other hand are economically objectionable, and tend to reduce the yield of ε-caprolactone, because under such low pressures distillation of side-products other than ε-caprolactone, e.g., ε-caprolactone dimer, ester of ε-hydroxycaproic acid with the alcohol present in the reaction system, etc., takes place.

As the alcoholic compound containing at least one alcoholic hydroxyl group in its molecule, which is to be added to the reaction system of this invention, at least one compound selected from the group consisting of:

(i) monovalent aliphatic or alicyclic alcohols of 8 or more carbon atoms, and (ii) divalent aliphatic or alicyclic alcohols of 2 or more carbon atoms, is suitably employed. Such alcoholic compound or compounds may be added as the ester thereof with hydroxycarboxylic acid, or the ester of a monocarboxylic acid with a divalent alcohol of above group (ii). However, addition in the form of such ester or esters produces no particular advantage.

Specific examples of the monovalent alcohols of group (i) include n-octyl alcohol, n-decyl alcohol, 1-dodecanol, myristyl alcohol, and stearyl alcohol. Preferred divalent alcohols of group (ii) include ethylene glycol, propylene glycol, diethylene glycol, 1,5-pentanediol, 1,6-hexanediol, 1,9 - nonanediol, 1,10-decanediol, 1,12-dodecanediol, etc.

Among the above-named alcohols, n-octyl alcohol, ethylene glycol, propylene glycol, and the like are distilled off from the reaction system of this invention at a relatively earlier stage, because they have boiling points lower than that of $\epsilon$-caprolactone. Therefore, when such alcohols and glycols are used, they may be continuously or intermittently added to the system during the reaction, to effectively practice the subject process.

There is no critical upper limit as to the carbon numbers in the monovalent and divalent alcohols. Any of the alcohols is useful as long as it maintains the liquid state under the reaction conditions suited for the invention, normally those of not more than 30 carbon atoms are preferred.

It is also possible, according to the invention, to use a trivalent alcohol such as glycerine, or a tetravalent alcohol such as pentaerythritol. However, the foregoing is not very recommended in that, the trivalent or tetravalent alcohols generally easily decompose under the conditions of this invention, and consequently a portion of those alcohols added tends to be lost and the decomposition products contaminate the $\epsilon$-caprolactone which is the desired product. Furthermore, the contaminated $\epsilon$-caprolactone is difficult of purification.

The construction of the apparatus for practicing the above reaction is not critical, as long as it possesses a container for reduced pressure heating of the starting material under the above-specified conditions and a member for evaporating $\epsilon$-caprolactone formed in the container and recovering the same. For the preparation of pure $\epsilon$-caprolactone at the highest possible yield, reaction apparatus equipped with a rectifying member to effect recirculation of vapors of starting material of intermediate products other than $\epsilon$-caprolactone into the reaction vessel are preferred. As such rectifying member, industrially commonly employed rectification columns, such as packed towers, perforated plate towers, bubble cap towers, etc. can be used. Also the reaction vessel used to perform heating of the starting material and evaporation of the $\epsilon$-caprolactone formed, can be the industrially commonly employed evaporators, for example, natural convection type evaporator, forced circulation type evaporator, film evaporator, etc. In addition to the foregoing, an evaporator of any type or model can be used as the reaction vessel of the present invention, as long as the same possesses sufficient volume to allow residence of the reaction mixture in the reaction vessel for the time required for the reaction as well as the heat-conductive area necessary for heating the starting material at the reduced pressures as specified above and evaporating the $\epsilon$-caprolactone etc. formed.

The distillate obtained in accordance with the subject process in certain cases contains, in addition to the desired $\epsilon$-caprolactone, the alcohol added to the reaction system, dimer of $\epsilon$-caprolactone, ester of the added alcohol with $\epsilon$-hydroxycaproic acid, etc. However, $\epsilon$-hydroxycaproamide itself is never present in the distillate. Isolation and recovery of $\epsilon$-caprolactone from such distillate can be effected by, for example, heating the distillate under conditions which cause the distilling off of $\epsilon$-caprolactone. That is, high purity $\epsilon$-caprolactone can be easily obtained by rectifying the distillate, for example, at the pressure and temperature condition as 1 mm. Hg and approximately 70° C., to 10 mm. Hg and 100° C. For the rectification, an evaporator as described above with a rectifying member employed for performing the subject reaction is used.

Thus according to the present invention, $\epsilon$-caprolactone can be formed through a single stage procedure under easily operable reaction conditions, furthermore at high yield, from $\epsilon$-hydroxycaproamide or an amide of a low polymer of $\epsilon$-hydroxycaproic acid, or a mixture of the foregoing.

As discussed above the $\epsilon$-caprolactone produced by the subject process can be converted to $\epsilon$-caprolactam through a liquid or vapor phase reaction with ammonia, and as the conversion means, known processes such as liquid phase reactions as in (a) and (b), and vapor phase reaction as in (c) and (d) are known.

The reaction residues remaining after recovering of so formed $\epsilon$-caprolactam from the reaction mixtures resulting from the reactions as above invariably contain $\epsilon$-hydroxycaproamide an amide of a low polymer of $\epsilon$-hydroxycaproic acid, or a mixture of the foregoing.

Upon application of subject process to such reaction residues, it is possible to convert the amides contained in the residues to $\epsilon$-caprolactone. Furthermore, concurrently with the separation and recovery of the amides in the reaction residues as $\epsilon$-caprolactone, the ammonia sideproduced by decomposition of the amides can be recovered.

For instance, according to the methods already described as (c) and (d) (British Pat. No. 1,109,540, and our co-pending application, Ser. No. 121,550). $\epsilon$-Caprolactam can be formed by contacting $\epsilon$-caprolactone and ammonia in the presence of hydrogen, in the vapor phase, with at least one catalyst selected from the group consisting of:

(1) at least one catalyst composed of (a) one or more oxides selected from the group consisting of silica gel, alumina, silica-alumina, silica-magnesia, alumina-magnesia, silica-alumina-magnesia, zirconium oxide, and titanium oxides, and (b) metal copper;
(2) catalysts of above group (1) which further contain minor amounts of metal or metal oxide other than the (b) metal copper, such as, for example, nickel or chromium oxide;
(3) copper-chromite catalysts; and
(4) catalysts formed by adding to copper-chromite catalysts other metals such as manganese, barium, nickel, and cobalt, or oxides of such metals, at temperatures ranging, for example, from 180 to 350° C., preferably from 220° to 320° C., for such short period as 1–50 seconds, preferably 4–18 seconds. For such reaction, 5–70 mols, particularly 10–50 mols, of hydrogen and 1–50 mols, particularly 2–25 mols, of ammonia, are used per mol of $\epsilon$-caprolactone, and the molar ratio of hydrogen to ammonia is preferably within the range of 0.2–30. The reaction is carried out under such pressures as, for example, 0.01–2 atmospheres, preferably 0.1–1.2 atmospheres. Presence of for example, 0.1–50 moles, particularly 5–30 mols, of water per mol of $\epsilon$-caprolactone in the reaction system is effective for inhibiting sidereactions, and consequently for producing $\epsilon$-caprolactam at still higher yield.

The formed $\epsilon$-caprolactam can be separated and recovered from the reaction mixture, by such means as, for example, distillation or extraction with a suitable solvent such as chloroform.

The distillation or extraction residue contains approximately 10–80% by weight of $\epsilon$-hydroxycaproamide, amide of a low polymer of $\epsilon$-hydroxycaproic acid, or a mixture of the foregoing. The residue also contains a large number of compounds other than such amides; such as, for example, carboxylic acids such as cyclopentane-carboxylic acid, 5-hexenoic acid, adipic acid, etc., esters of such acids with such alcohols; amines of the named carboxylic acids; lactam derivatives such as N-carbamoylpentyl-$\epsilon$-caprolactam; and other various high boiling point compounds of unknown structures.

According to the invention, such reaction residue containing $\epsilon$-hydroxycaproamide and/or an amide of a low polymer of $\epsilon$-hydroxycaproic acid, which remains after the recovery of $\epsilon$-caprolactam from the reaction mixture resulting from the reaction of $\epsilon$-caprolactone with ammonia at temperature ranging from 180° to 350° C., can be used as the starting material.

That is, according to the invention, such reaction residue is heated at the pressures ranging from 0.1–300 mm. Hg and temperatures ranging from 0.1–300 mm. Hg and temperatures ranging from 180 to 340° C., in the presence of an alcoholic compound containing at least one alcoholic hydroxyl group in its molecule, under the conditions satisfying the formula, $$X \geq 1.01Y \quad (1)$$

preferably the formula (2) below, $$X \geq 1.05Y \quad (2)$$

*inter alia*, the formula (3), $$X \geq 1.1Y \quad (3)$$

in the above formula (1), (2), or (3) under the assumption that every ester linkage and/or acid amide linkage in all of the compounds contained in the residue is hydrolyzed, X is the total number of alcoholic hydroxyl groups present in the residue, and Y is the total number of carboxyl groups present in the residue, to allow distillation of ε-caprolactone and ammonia. Thus the amides contained in the reaction residue can be converted to ε-caprolactone through a very easy operation and at high yield.

Therefore, the invention has such advantages that the amides contained in the reaction residue can be efficiently separated when converted to ε-caprolactone, and that ammonia can be recovered simultaneously.

While an embodiment for applying the invention to the reaction residue derived by separating ε-caprolactam from the reaction mixture of the vapor phase preparation of ε-caprolactam from ε-caprolactone has been described above, the invention is equally applicable to the reaction residue remaining after the separation of ε-caprolactam from the reaction mixture of the liquid phase reaction of ε-caprolactone with aqueous ammonia. That is, the amides contained in such reaction residue can also be converted to ε-caprolactone by the subject process with high yield, and can be easily separated from the residue.

Hereinafter the subject process will be described in further detail, with reference to the following Examples.

EXAMPLE 1

Sixty (60) g. of ε-hydroxycaproamide

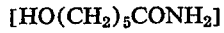
[HO(CH$_2$)$_5$CONH$_2$]

and 12 g. of 1,6-hexanediol were charged into 200 cc. capacity reactor equipped with a packed rectification column of ten theoretical plates, and reacted for 3 hours at 260° C., under a reduced pressure of 10 mm. Hg. The reflux ratio during the reaction was 45/15 (sec./sec.). Thus 52.4 g. of a distillate were obtained, and the distillation residue was 5.8 g. The distillate contained 51.3 g. of ε-caprolactone, corresponding to an yield of 98 mol percent based on the charged ε-hydroxycaproamide. Besides 2.5 g. of a distillate was caught by the Dry Ice-methanol trap, which had the stimulative smell of ammonia.

EXAMPLE 2

The reaction of Example 1 was performed for 5 hours under the identical conditions, except that the starting ε-hydroxycaproamide was replaced by 60 g. of an end amide of a low polymer (degree of polymerization; approx. 5–9) of ε-hydroxycaproic acid. Thus 57.3 g. of a distillate were obtained, which contained 57.1 g. of ε-caprolactone.

EXAMPLE 3

The reaction of Example 1 was repeated except that 1,12-dodecanediol was used as the alcohol. Thus 51.5 g. of a distillate were obtained, and the distillation residue was 6.7 g. The distillate contained 51.4 g. of ε-caprolactone.

EXAMPLE 4

Forty (40) g. of ε-hydroxycaproamide

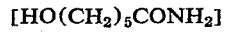
[HO(CH$_2$)$_5$CONH$_2$]

and an alcoholic hydroxyl group-containing compound specified in the table below of the specified amount were charged in a 100 cc. capacity reactor equipped with a packed rectification column of ten theoretical plates, and allowed to react for approximately 2 hours. The reaction was performed under a reduced pressure of 30 mm. Hg, and the reaction temperature was gradually raised from the initial 215° C., with the distillation of the reaction product, to final 260° C. In all runs the employed reflux ratio was 45/15 (sec./sec.).

TABLE 1

| Run No. | Alcoholic hydroxyl group-containing compound | Weight of alcohol employed with 40 g. of ε-hydroxycaproamide (g.) | Distillate (g.) | ε-Caprolactone (g.) | Yield (percent) |
| --- | --- | --- | --- | --- | --- |
| 1 | Ethylene glycol | 50 | 73.3 | 19.0 | 55 |
| 2 | 1,4-butanediol | 40 | 65.6 | 28.0 | 81 |
| 3 | Diethylene glycol | 40 | 68.1 | 30.9 | 89 |
| 4 | n-Octyl alcohol | 20 | 41.3 | 22.2 | 64 |
| 5 | Lauryl alcohol | 20 | 41.2 | 26.8 | 77 |
| 6 | Cetyl alcohol | 4 | 30.2 | 28.2 | 81 |
| 7 | Stearyl alcohol | 5 | 32.1 | 29.4 | 85 |
| 8 | 1,10-decanediol | 1 | 28.8 | 28.6 | 82 |
| 9 | 1,12-dodecanediol | 1 | 27.5 | 27.0 | 78 |
| 10 | do | 5 | 34.0 | 32.6 | 94 |
| 11 | do | 10 | 35.7 | 32.1 | 92 |
| 12 | None | 0 | 2.2 | 0.4 | 1.1 |

EXAMPLE 5

(a) Catalyst preparation 625 grams of copper nitrate [Cu(NO$_3$)$_2$·3H$_2$O] were dissolved in water to form 7 liters of an aqueous solution. In the solution, 480 g. of titanium oxide powder was suspended by 30 minutes stirring. The particle size of the titanium oxide in the resulting suspension as separately measured by the sedimentation method was mostly within the range of 28–35 microns.

Into the aqueous suspension 1.0 mol/liter of an aqueous sodium carbonate was dropped for an hour at room temperature under stirring, to adjust the former's pH to 9.5. The system was further stirred for 30 minutes, and allowed to stand overnight. The formed precipitate that formed was thoroughly washed with water by decantation, filtered, and dried at 90–110° C.

The powder obtained was carefully thermally decomposed in a stainless steel vessel with thorough stirring. The calcined product had a composition corresponding to 70 wt. percent of TiO$_2$ and 30 wt. percent of CuO. The weight ratio of Cu/TiO$_2$ after hydrogen reduction corresponded to 0.34.

(b) Preparation of ε-caprolactam

The powdery calcination product was milled with water, dried, and ground. The particles of the sizes ranging from 9 to 12 mesh were gathered and used as the catalyst.

The reactor was composed of a 1,110 mm. long, vertical quartz tube of 60 mm. in inner diameter, provided with an entrance for the dropwise addition of starting material, a gas inlet, and a steam inlet at 60 mm. below the upper end, and also with a gaseous reaction mixture exit at the bottom portion. The steam to be introduced into the steam inlet was fed through a water evaporator. The gaseous reaction mixture was collected at a receiver through a condenser cooled by water and further passed through a trap filled with Dry Ice-methanol coolant. Two perforated plates were provided in the reactor, respectively at 50 mm. and 450 mm. above the bottom, and from the lower plate porcelain Raschig rings were packed to a height of 50 mm. Further on the rings 500 cc. of the above catalyst were packed, and on which again porcelain Raschig rings were packed to the height leaving a space of 50 mm. between the upper perforated plate. Separately, porcelain Raschig rings were packed on the upper perforated plate, leaving a space of 90 mm. between the top of the packed layer and the top of the reactor. The packed layer on the upper plate was to serve as the preheating zone. One thermometer was installed at approximately the respective centers of each of the preheating and catalyst layers. The reactor was wound with a belt heater, and further on the heater, with an asbestos belt.

Nitrogen gas was introduced into the reactor through the gas inlet, until the inside atmosphere was thoroughly substituted. Then a gaseous mixture of hydrogen at a flow rate of 0.05–0.25 liter/min. and nitrogen at a flow rate of 3.0 liters/min. was fed into the reactor. Thus the catalyst reduction was effected for 7 hours at 150–250° C., while suitably varying the flow rate of hydrogen gas to maintain the appropriate temperature condition against the temperature rise due to the exothermic reaction. Then hydrogen gas alone was passed for 3 hours at 250° C. at a flow rate of 1.5 liters/min. Thereafter the temperature at the preheating layer was set to be 260° C., and that at the catalyst layer, 250° C.

Further hydrogen gas and ammonia were passed through the reactor from the gas inlet, at the respective flow rate of 80 liters/hr. and 1.8 liters/min. Simultaneously water was sent through the evaporator into the reactor, at a rate of 57 g./hr. and $\epsilon$-caprolactone, was supplied at a rate of 18 g./hr.

Under the above conditions, 869 g. of $\epsilon$-caprolactone were reacted, consuming 4.8 hours. From the reaction mixture water was removed by reduced pressure distillation, and the residue was fractionated. The initial fraction of distillate (the distillate obtained before the distillation of $\epsilon$-caprolactam) was composed mainly of 9.3 g. of $\epsilon$-caprolactone, and water. At the temperature range of 103–107° C. (3 mm. Hg; bath temperature, 140–195° C.), 651 g. of $\epsilon$-caprolactam were obtained, and 197 g. of a distillation residue remained.

(c) Recovery of $\epsilon$-caprolactone

Sixty (60) g. of thus obtained distillation residue and 20 g. 1,6-hexanediol were charged in a 200 cc. capacity reactor which was equipped with a packed rectification column of 10 theoretical plates. The reaction was performed for 3 hours at 260° C., under a reduced pressure of 10 mm. Hg. The reflux ratio employed was 45/15 (sec./sec.). As a result 33.1 g. of a distillate were obtained. Upon gas chromatography analysis of the distillate, its $\epsilon$-caprolactone content was confirmed to be 30.8 g. Calculating from those result, 101 g. of $\epsilon$-caprolactone would be recovered from 197 g. of the distillation residue. If the $\epsilon$-caprolactone recovered by the fractionation of reaction mixture was taken into consideration, the total $\epsilon$-caprolactone recovery amounted to 110 g. Based on the recovered $\epsilon$-caprolactone, the selectivity for $\epsilon$-caprolactam was 87%, and the conversion of $\epsilon$-caprolactone also was 87%.

EXAMPLE 6

Similarly to Example 5–(b), 437 g. of $\epsilon$-caprolactone were reacted under identical conditions. The temperature at both the preheating layer and catalyst layer was set to be 260° C. The reaction required 24 hours. The reaction mixture obtained was extracted with the equal amount (by volume) of chloroform three times.

Thereafter the resulting aqueous phase was distilled to remove the water content, leaving 99 g. of the distillation residue. Sixty (60) g. of the residue and 12 g. of 1,6-hexanediol were charged in the same apparatus as employed in Example 5–(c), and allowed to react for 3 hours and 40 minutes under identical conditions.

Thus 46.1 g. of a distillate were obtained, which contained 45.5 g. of $\epsilon$-caprolactone. Calculating from this result, 75.0 g. of $\epsilon$-caprolactone would be recovered from 99 g. of the distillation residue.

Furthermore, chloroform was separated by distillation from the chloroform phase resulting from the extraction of the reaction mixture. The residue was fractionated to yield 300 g. of $\epsilon$-caprolactam.

EXAMPLE 7

(a) Catalyst preparation

Two liters of an aqueous solution containing 520 g. of copper nitrate [Cu(NO$_3$)$_2 \cdot$3H$_2$O] and 57 g. of barium nitrate were maintained at 80° C., and 2 liters of another aqueous solution containing 302 g. of ammonium dichromate and 500 cc. at 28% aqueous ammonia, of room temperature, were added thereto under stirring. The precipitate which formed was filtered, and dried at 70–90° C., and a powder was recovered, which was then carefully thermally decomposed. The calcination product was cooled to room temperature, immersed in 1.5 liters of 10% aqueous aceteic acid for 30 minutes, filtered, washed with water, and dried at 90°–110° C. The powder obtained was moulded into grains of 9–12 mesh in size.

(b) Preparation of $\epsilon$-caprolactam

The reactor was composed of a 500 mm. long preheating tube and a 600 mm. long reaction tube. Both tubes had an inner diameter of 24 mm., and were inclined by 30°. The two tubes were connected by one end. The preheating tube was packed with 120 cc. of glass balls each of 3 mm. in diameter. At approximately the center of the preheating tube an opening was provided for dropwise supply of water, and at approximately one-fourth of its length from the upper end another opening for dropwise supply of starting material was provided. The reaction tube was packed with, from the connected part to the preheating tube, 120 cc. of glass balls each of 3 mm. in diameter, 80 cc. of above-described catalyst, and again 20 cc. of the glass balls, by the order stated. A thermometer was set at approximately the center of the catalyst layer.

The preheating and reaction tubes were wound with a belt heater, and further, with an asbestos belt. The catalyst was reduced by a gaseous mixture of hydrogen and nitrogen, at temperatures not higher than 220° C., and thereafter the temperature of the preheating layer was set at 250° C., and that of the catalyst layer, 240° C. Hydrogen gas was introduced from the upper end of the preheating tube at a flow rate of 12 liters/hr., and ammonia gas was fed into the reaction tube from its upper end, at a flow rate of 6 liters/hr. Simultaneously, $\epsilon$-caprolactone was dropped into the preheating tube at a rate of 3.1 g./hr., and water, at a rate of 9.6 g./hr. Thus 148 g. of $\epsilon$-caprolactone were reacted, consuming 48 hours. The reaction residue was extracted 4 times each with an equal amount of chloroform. From the aqueous phase water was driven off by distillation. As a result, 56.4 of a distillation residue were obtained.

(c) Recovery of $\epsilon$-caprolactone

The total amount of the distillation residue and 10 g. of 1,6-hexanediol were charged into the same apparatus as employed in Example 5–(c), and reacted for 3.5 hours at 263° C. under a reduced pressure of 10 mm. Hg. The reflux ratio was 45/15 (sec./sec.). As a result 45.3 g. of a distillate were obtained, which contained 42.2 g. of $\epsilon$-caprolactone.

Separately, from the chloroform phase resulting from the extraction of reaction mixture, chloroform was removed by distillation, and the residue was fractionated. As a result 75.0 g. of $\epsilon$-caprolactam were obtained.

EXAMPLE 8

(a) Catalyst preparation

Two liters of an aqueous solution containing 688 g. of copper nitrate [Cu(NO$_3$)$_2 \cdot$3H$_2$O] and 53.7 g. of nickel nitrate [Ni(NO$_3$)$_2 \cdot$6H$_2$O], 550 g. of titanium oxide powder were added, and suspended by 30 minutes stirring. In the suspension, most of the titanium oxide particles had diameters of 28–35 microns. The suspension was processed similarly to Example 5–(a), to provide the catalyst.

The catalyst composition correspond to, before the reduction with hydrogen, $TiO_2$ 69.9 wt. percent, CuO 28.7 wt. percent, and NiO 1.4 wt. percent, and after the reduction, $Cu/TiO_2$ (weight ratio) of 0.329 and $Ni/TiO_2$ (weight ratio) of 0.016.

(b) Preparation of ε-caprolactam

The same reactor as employed in Example 5–(b) was used, in which 480 cc. of the above catalyst were packed similarly to Example 5–(b), and reduced with hydrogen. The temperature of the preheating layer was set at 260° C., and that of the catalyst layer, 250° C.

The reactor was fed with hydrogen gas at a flow rate of 80 liters/hr., ammonia gas at a flow rate of 18 liters/hr., water at a supply rate of 57 g./hr., and with ε-caprolactone, at a supply rate of 18 g./hr. The reaction was performed similarly to Example 5–(b), and 90 g. of ε-caprolactone obtained by distillation-refining the crude caprolactone recovered in Examples 5 through 7 were reacted within 5 hours. Upon gas chromatography analysis of the resulting reaction mixture, its ε-caprolactam content was confirmed to be 74 g.

Further 352 g. of ε-caprolactone were reacted in the reactor during the following 14 hours, under the conditions below; temperature of the preheating layer, 260° C.; temperature of the catalyst layer, 250° C., flow rate of hydrogen gas, 112 liters/hr.; flow rate of ammonia gas, 28 liters/hr.; supply rate of water, 57.8 g./hr., and the supply rate of ε-caprolactone, 25.2 g./hr. The resulting reaction mixture was distilled to remove water, and then fractionated. After distilling off the formed ε-caprolactam 110 g. of a distillation residue were obtained.

(c) Recovery of ε-caprolactone

Fifty-four (54) g. of this distillation residue and 10 g. of 1,12-dodecanediol were charged into the same apparatus as employed in Example 5–(c), and reacted for 4 hours at 260° C., under a reduced pressure of 10 mm. Hg. The reflux ratio was 45/15 (sec./sec.). As a result, 41.8 g. of ε-caprolactone was obtained as the distillate.

Separately, 54 g. of the distillation residue remaining after the separation of ε-caprolactam were similarly reacted with 10 g. myristyl alcohol, yielding 40.3 g. of the distillate, which contained 39.9 g. of ε-caprolactone.

EXAMPLE 9

Successively to Example 8–(b), 504 g. of ε-caprolactone were reacted under identical reaction conditions, consuming 20 hours. The reaction mixture was extracted with an equal amount of chloroform 3 times. Water was removed by distillation from the aqueous phase, and 224 g. of the distillation residue were fractionated. Thus 6.3 g. of a distillate were obtained at the distillation temperature of below 65° C., and the bath temperature of below 200° C. (4 mm. Hg). The distillate contained 3.9 g. of ε-caprolactone. Then at the distillation temperature of 65–95° C., and bath temperature of 200–280° C. (3–4 mm. Hg), 37.6 g. of a distillate were obtained within 2 hours, which distillate contained 23.6 g. of ε-caprolactone and 0.66 g. of ε-caprolactam.

After the fractionation 179 g. of a distillation residue were obtained, which coagulated at room temperature.

Forty-four (44) g. of the above residue and 20 g. of 1,6-hexanediol were charged into the same reactor as used in Example 5–(c), and reacted under identical conditions for 5 hours.

The resulting 50.9 g. of the distillate contained 35.1 g. of ε-caprolactone and a minor amount of 1,6-hexanediol.

EXAMPLE 10

Successively to Example 9–(b), 216 g. of ε-caprolactone were reacted over 12 hours, under the following reaction conditions: temperature of the preheating layer, 260° C.; temperature of the catalyst layer 250° C.; flow rate of hydrogen gas, 210 liters/hr., flow rate of ammonia gas, 90 liters/hr., and the supply rate of ε-caprolactone, 18 g./hr. The reaction residue was mixed with an 300 g. of water, and extracted with equal amount (by volume) of chloroform 4 times. Removing water from the aqueous phase by distillation, 64 g. of a distillation residue were obtained.

All of the residue and 12 g. of stearyl alcohol were charged into the same reactor as employed in Example 5–(c), and reacted for 3 hours at 260° C., under a reduced pressure of 10 mm. Hg. The reflux ratio was 45/15 (sec./sec.). As a result 48.2 g. of ε-caprolactone were obtained as the distillate.

EXAMPLE 11

The chloroform phases resulting from extraction of the reaction mixtures of Examples 6 through 9 were distilled to remove chloroform. Then ε-caprolactam was separated from the residues by distillation. The last distillation residues were collected, and 60 g. thereof were reacted for 3 hours in the presence of 12 g. of 1,6-hexanediol, in the same reactor and under identical conditions to those of Example 5–(c).

Thus 23.0 g. of a distillate were obtained, which contained 19.6 g. of ε-caprolactone.

EXAMPLE 12

(a) Catalyst preparation

In 70 liters of water 3.00 kg. of $Na_2CO_3$ were dissolved, and in the solution 5.00 kg. of $TiO_2$ were suspended by approximately one hour stirring. Into the suspension 50 liters of an aqueous solution containing 6.15 kg. of copper nitrate and 0.234 kg. of nickel nitrate were dropped, which required approximately 2 hours. After the following two days standing, the supernatant was separated by decantation repeated several times, filtered, and dried. The resulting solid was calcined at 300–350° C., and then molded into tablets each of 5 mm. in diameter and 2 mm. in thickness.

(b) Preparation of ε-caprolactam

Five (5) kg. of the above catalyst were packed in a reaction tube of 180 mm. in diameter and 2 m. in length, and in the reactor an ε-caprolactam-forming reaction was continuously performed for approximately 100 hours, under the following conditions; the reaction temperature, 260° C., supply rate of ε-caprolactone, 100 g./hr., flow rate of hydrogen gas, 0.4 m.$^3$/hr., and a supply rate of water, 300 g./hr. The product was collected at room temperature, and stored in a drum as an aqueous solution.

(c) Processing of the reaction product

A part of the reaction mixture was taken, and water was driven off therefrom. The residue was subjected to a simple distillation under a reduced pressure of 2 mm. Hg, to separate ε-caprolactam. Approximately 1 kg. of the distillation residue was obtained.

Again a part of the residue was taken and hydrolyzed with caustic soda. During the operation generation of a considerable amount of ammonia due to the hydrolysis of amides was observed.

The system was then neutralized with hydrochloric acid, and extracted with ether. Diazomethane was added to the ether phase so that the free acid therein was converted to the methyl ester thereof. Then the methyl ε-hydroxycaproate was quantitatively analyzed by gas chromatography. As a result it was verified that 1 g. of the residue contained 3.50 milliequivalent of ε-hydroxycaproic acid derivatives.

(d) Recovery of ε-caprolactone

Each 40 g. of the above residue together with various alcohols of varied amount as specified in Table 2 below were reacted in the same apparatus as employed in Example 1, to effect the recovery of ε-caprolactone.

TABLE 2

| Alcoholic hydroxyl group-containing compound | Amount of alcohol (g.) | Pressure (mm. Hg) | Temp. (° C.) | Distillate (g.) | ε-Caprolactone (g.) | Yield (percent)* |
|---|---|---|---|---|---|---|
| n-Octyl alcohol | 20 | 150-30 | 230-260 | 17.0 | 2.02 | 13 |
| n-Decyl alcohol | 18 | 150-30 | 240-260 | 19.0 | 5.60 | 35 |
| Stearyl alcohol | 40 | 30-10 | 260 | 35.3 | 10.14 | 65 |
| 1,4-butanediol | 40 | 100-30 | 220-260 | 41.0 | 7.46 | 47 |
| Diethylene glycol | 40 | 50-30 | 260 | 48.9 | 6.94 | 44 |
| 1,6-hexanediol | 40 | 30 | 260 | 42.2 | 12.81 | 81 |
| 1,12-Dodecanediol | 15 | 30 | 260 | 17.0 | 13.65 | 86 |
| Do | 2 | 20 | 260 | 16.0 | 13.20 | 83 |

*The yield was calculated based on the equivalent number of the ε-hydroxycaproic acid derivatives contained in the starting material.

The starting material in each run was 40 g. of the above simple distillation residue.

EXAMPLE 13

ε-Caprolactam was separated from the same aqueous solution of the reaction mixture obtained in Example 12 by simple distillation. Forty (40) g. each of the distillation residue together with the amount of 1,6-hexanediol indicated (HDO) were charged in the same apparatus as employed in Example 1, and reacted under the various temperature and pressure conditions specified in Table 3 below, with the results as given in the same Table.

TABLE 3

| HDO (g.) | Reaction Temp. (° C.) | Pressure (mm. Hg) | Distillate (g.) | ε-Caprolactone (g.) | Yield (percent)* |
|---|---|---|---|---|---|
| 0.2 | 260 | 30 | 4.2 | 3.7 | 23 |
| 0.5 | 260 | 30 | 4.6 | 4.2 | 26 |
| 40 | 260 | 30 | 31.3 | 12.6 | 79 |
| 40 | 170 | 30 | 3.2 | 0.7 | 44 |
| 40 | 200 | 30 | 30.1 | 4.6 | 29 |
| 40 | 295 | 30 | 35.7 | 10.9 | 69 |
| 40 | 260 | 100 | 36.0 | 9.7 | 61 |

*The yield was calculated based on the equivalent number of the ε-hydroxycaproic acid derivative contained in the starting material, similarly to Example 12.

EXAMPLE 14

Approximately 2 liters of the aqueous solution of reaction mixture obtained in Example 12-(b) were extracted 5 times, each using 1 liter of chloroform. From the aqueous phase remaining after the extraction, water was driven off, and approximatey 120 g. of a residue were obtained. A part of the residue was hydrolyzed for quantitative analysis of ε-hydroxycaproic acid similarly to Example 12. It was confirmed that 1 g. of the residue contained 6.98 milliequivalent of ε-hydroxycaproic acid derivatives. Forty (40) g. each of the residue and the alcohol of specified type and amount in Table 4 below were reacted in the same apparatus as employed in Example 1, at the reaction temperature of 260° C. and pressure of 30 mm. Hg. Thus ε-caprolactone was recovered from the residue which was composed mainly of ε-hydroxycaproamide and amides of low polymerization products of ε-hydroxycaproic acid, with the results as given in Table 4.

TABLE 4

| Alcoholic hydroxyl group-containing compound | Weight of alcohol (g.) | Distillate (g.) | ε-Caprolactone (g.) | Yield (percent)* |
|---|---|---|---|---|
| 1,6-hexanediol | 40 | 58.8 | 28.7 | 90 |
| Cetyl alcohol | 15 | 30.2 | 28.1 | 88 |
| 1,12-dodecanediol | 5 | 30.3 | 29.4 | 92 |

*The yield was calculated based on the equivalent number of the ε-hydroxycaproic acid derivatives contained in the starting material.

What is claimed is:

1. A process for the preparation of ε-caprolactone which comprises heating at least one amide selected from the group consisting of ε-hydroxycaproamide and amides of low polymerization products of ε-hydroxycaproic acid represented by the following formula,

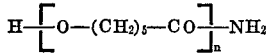

in which n is a positive integer of 2–20, and represents the average degree of polymerization, in the presence of an alcoholic compound containing at least one free alcohol hydroxyl group in its molecule and which is selected from at least one of the group consisting of: monovalent, aliphatic or alicyclic alcohols having from 8 to 30 carbon atoms; divalent aliphatic or alicyclic alcohols having from 2 to 30 carbon atoms; esters of the foregoing alcohols with hydroxycarboxylic acids; esters of the foregoing divalent alcohols with monocarboxylic acids; and the foregoing alcohols with one or two alkyl or phenyl substituent moieties, in an amount that, when one ε-hydroxycaproic acid unit of the formula,

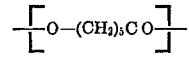

contained in said amide is calculated as one molecule of ε-hydroxycaproic acid, the total number of free alcoholic hydroxyl groups present in the reaction system exceeds the total number of carboxyl groups present in the reaction system, under such temperature and pressure conditions that allow distillation of ε-caprolactone.

2. A process for the preparation of ε-caprolactone which comprises heating at least one amide selected from the group consisting of ε-hydroxycaproamide and amides of low polymerization products of ε-hydroxycaproic acid represented by the following formula,

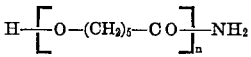

in which n is a positive integer of 2–20, and represents the average degree of polymerization, in the presence of an alcoholic compound containing at least one free alcoholic hydroxyl group in its molecule and which is selected from at least one of the group consisting of: monovalent aliphatic or alicyclic alcohols having from 8 to 30 carbon atoms; divalent aliphatic or alicyclic alcohols having from 2 to 30 carbon atoms; esters of the foregoing alcohols with hydroxycarboxylic acids, esters of the foregoing divalent alcohols with monocarboxylic acids; and the foregoing alcohols with one or two alkyl or phenyl substituent moieties, in an amount satisfying the formula below:

$$X \geq 1.01 Y$$

wherein, under the assumption that every ester linkage, acid amide linkage or mixture of said linkages contained in all of the compounds present in the reaction system is hydrolyzed, X is the total number of the hydroxyl groups present in the reaction system, and Y is the total number of the carboxyl groups present in the reaction system, at such temperature and pressure conditions that allow distillation of ε-caprolactone.

3. A process for the preparation of ε-caprolactone, which comprises heating ε-hydroxycaproamide, an amide of a low polymer of ε-hydroxycaproic acid represented by the following formula,

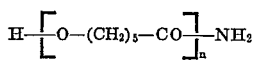

in which n is a positive integer of 2–20, and represents the average degree of polymerization, or a mixture of the foregoing, in the presence of a monovalent aliphatic or alicyclic alcohol of from 8 to 30 carbons, or a divalent aliphatic or alicyclic alcohol of from 8 to 30 carbons, or an ester of at least one of said alcohols with ε-hydroxycaproic acid or a low polymerization product thereof, in an amount that supplies sufficient free alcoholic hydroxyl groups to satisfy the formula $$X \geqq 1.01Y$$

wherein, under the assumption that every ester linkage, acid amide linkage or mixture of said linkages contained in all the compounds present in the reaction system is hydrolyzed, X is the total number of hydroxyl groups present in the reaction system, and Y is the total number of carboxyl groups present in the reaction system, at such temperature and pressure conditions that allow distillation of ε-caprolactone.

4. The process of Claim 1, in which the distillation of ε-caprolactone is effected by heating the system at a pressure within the range of 0.1 to 300 mm. Hg, and at a temperature within the range of 180–340° C.

5. The process of Claim 2, in which the formula to be satisfied is:

$$X \geqq 1.05Y$$

wherein X and Y are as defined above.

6. The process of Claim 1, wherein the heating is performed in a vessel equipped with a rectifying means at its upper part.

7. The process of Claim 1, which comprises heating the reaction residue containing said ε-hydroxycaproamide, an amide of a low polymer of ε-hydroxycaproic acid or mixture thereof, which is obtained after separating ε-caprolactam from the reaction mixture resulting from reaction of ε-caprolactone, with ammonia at temperatures ranging from 180–350° C., in the presence of an alcoholic compound containing at least one alcoholic hydroxyl group in its molecule, in an amount satisfying the formula, $$X \geqq 1.01Y$$

wherein, under the assumption that every ester linkage, acid amide linkage or mixture of said linkages contained in all the compounds present in the residue is hydrolyzed, X is the total number of alcoholic hydroxyl groups present in the residue, and Y is the total number of carboxyl groups present in the residue, at a pressure within the range of 0.1–300 mm. Hg, and a temperature within the range of 180–340° C., allowing distillation of ε-caprolactone and ammonia.

8. The process of Claim 7, wherein the starting reaction residue is that obtained after separating ε-caprolactam from the reaction mixture resulting from the reaction of ε-caprolactone with ammonia in the presence of hydrogen, in the vapor phase, at a temperature within the range of 180–350° C.

9. The process of Claim 2, in which the distillation of ε-caprolactone is effected by heating the system at a pressure within the range of 0.1 to 300 mm. Hg, and at a temperature within the range of 180–340° C.

10. The process of Claim 3, in which the distillation of ε-caprolactone is effected by heating the system at a pressure within the range of 0.1 to 300 mm. Hg, and at a temperature within the range of 180–340° C.

11. The process of Claim 3, in which the formula to be satisfied is:

$$X \geqq 1.05Y$$

wherein X and Y are as defined above.

12. The process of Claim 5, in which the formula to be satisfied is:

$$X \geqq 1.1Y$$

wherein X and Y are as defined above.

13. The process of Claim 11, in which the formula to be satisfied is:

$$X \geqq 1.1Y$$

wherein X and Y are as defined above.

14. The process of Claim 2, wherein the heating is performed in a vessel equipped with a rectifying means at its upper part.

15. The process of Claim 3, wherein the heating is performed in a vessel equipped with a rectifying means at its upper part.

References Cited

UNITED STATES PATENTS 3,624,258    11/1971    Ishimoto et al. _____ 260—343

JOHN M. FORD, Primary Examiner

UNITED STATES PATENT OFFICE
CERTIFICATE OF CORRECTION

Patent No. 3,825,570                     Dated July 23, 1974

Inventor(s) Fujita, et al.

It is certified that error appears in the above-identified patent and that said Letters Patent are hereby corrected as shown below:

In the heading, insert:

-- Claims priority, application Japan, filed November 4, 1970, No. 70/96410 --

Signed and sealed this 5th day of November 1974.

(SEAL)
Attest:

McCOY M. GIBSON JR.
Attesting Officer

C. MARSHALL DANN
Commissioner of Patents